(12) United States Patent
Lyatkher

(10) Patent No.: US 8,007,235 B1
(45) Date of Patent: Aug. 30, 2011

(54) ORTHOGONAL POWER UNIT

(76) Inventor: Victor Lyatkher, Richmond Heights, OH (US)

( * ) Notice: Subject to any disclaimer, the term of this patent is extended or adjusted under 35 U.S.C. 154(b) by 0 days.

(21) Appl. No.: 12/769,597

(22) Filed: Apr. 28, 2010

(51) Int. Cl.
*F03B 3/12* (2006.01)

(52) U.S. Cl. .............. 416/1; 416/198 R; 416/200 R; 415/68; 415/908

(58) Field of Classification Search .............. 415/66, 415/68, 908; 416/200 R, 198 R, 202, 201 A, 416/201 R, 203, 1; 290/42, 43, 44, 55
See application file for complete search history.

(56) References Cited

U.S. PATENT DOCUMENTS

| | | | | |
|---|---|---|---|---|
| 2,224,851 | A * | 12/1940 | Lea | 416/170 R |
| 3,638,920 | A * | 2/1972 | Davis | 366/298 |
| 5,835,827 | A * | 11/1998 | Kishimoto | 399/254 |
| 6,492,743 | B1 * | 12/2002 | Appa | 290/55 |
| 7,358,623 | B2 * | 4/2008 | Richards et al. | 290/55 |
| 7,360,995 | B2 * | 4/2008 | Suzuki | 416/211 |
| 2007/0297284 | A1 * | 12/2007 | Neier et al. | 366/299 |
| 2007/0297906 | A1 * | 12/2007 | Wu | 416/198 R |
| 2008/0203731 | A1 * | 8/2008 | Dulcetti Filho | 290/44 |
| 2008/0303288 | A1 * | 12/2008 | Hamann | 290/55 |
| 2009/0016887 | A1 * | 1/2009 | Vettese et al. | 416/198 R |
| 2009/0140528 | A1 * | 6/2009 | Ireland | 290/55 |
| 2009/0180878 | A1 * | 7/2009 | Alunni | 416/132 B |
| 2009/0268549 | A1 * | 10/2009 | Neier et al. | 366/290 |
| 2010/0104441 | A1 * | 4/2010 | Manley et al. | 416/200 R |
| 2010/0213720 | A1 * | 8/2010 | Bailey et al. | 290/55 |
| 2010/0225118 | A1 * | 9/2010 | Micu | 290/55 |
| 2010/0230972 | A1 * | 9/2010 | Haar | 290/55 |
| 2010/0233919 | A1 * | 9/2010 | Ersoy | 440/8 |
| 2010/0253084 | A1 * | 10/2010 | Lin et al. | 290/55 |

FOREIGN PATENT DOCUMENTS

WO    WO 2009010736 A2 *  1/2009

\* cited by examiner

*Primary Examiner* — Edward Look
*Assistant Examiner* — Aaron R Eastman

(57) ABSTRACT

Orthogonal power unit contains a turbine with a shaft and blades of hydrofoil profile fixed around and along the shaft and the power generator. The turbine has six layers, and each layer has one blade fixed at the shaft. The blades of turbine layers are located uniformly in the peripheral direction around the turbine shaft forming three pairs of the adjacent blades. In each pair the blades are located at the opposite sides relative to the shaft, the blades in the utmost pairs have the same length L and the blades in the middle pair have the bigger length $L_0 = L \, 2^{0.25}$ each. The traverse masses of the middle and utmost blade pairs have the same ratio. The same balancing effect achieved by having the uniform length of all blades with the relative shift of balanced pairs of blades at 60° and with the uniform traverses masses.

12 Claims, 2 Drawing Sheets

ORTHOGONAL POWER UNIT

FIELD OF THE INVENTION

The invention relates to the power engineering industry field and can be used when making the construction of low-pressure or free-flow river power plants, tidal or wind power stations.

BACKGROUND OF THE INVENTION

There is known the hydroturbine plant containing two turbines horizontally and coaxially installed in the water conduit and having one power generator (USSR Inventor's Certificate SU No 1280178 issued Dec. 30, 1986). In that power unit the coaxial shafts of the turbines are oriented along the water conduit and are connected by the multiplier located in the pressurized shell in the water conduit center with the generator vertical shaft installed outside the water conduit.

However this leads to the energy usage low efficiency of the water flow coming through the water conduit section. This is stipulated by the fact that the turbines (the propeller type in this case) work alternatively depending on the flow direction and that the shell with the multiplier located in the water conduit effective section center partially closes the working flow directed along the turbine shafts.

The most similar to the invention in accordance with the technical content and achieved result is the power unit containing two coaxially installed orthogonal turbines with the blades of the hydrofoil profile and having the power generator. At that the turbine shafts are oriented across the medium flow, the blades of orthogonal turbines are oriented in the opposite direction relative to each other to rotate the orthogonal turbines in the opposite unchanged directions irrespective of the flow direction coming through the orthogonal turbines. The three-phase power generator is located between the orthogonal turbines (Russian Federation Patent RU No 22245456 issued Nov. 20, 2003).

In this power unit the reaction loads are significantly reduced due to the rotation of the orthogonal turbines with blades of the hydrofoil profile in the different directions, but it's impossible fully to compensate them in consequence of the out-of-phase fluctuating forces acting on the upper and lower orthogonal turbines. As far as the loads acting on the orthogonal turbines are not fully balanced this causes the vibration deteriorating the operation conditions of the power unit and reducing its reliability. Except it the presence of several hydrofoil profiles in each layer of the orthogonal turbine leads to the power efficiency reduction. It is known that single-bladed turbines are the most effective turbines of this class. But single-bladed turbines are not mechanically balanced requiring special masses to balance it.

BRIEF GENERAL DESCRIPTION OF THE INVENTION

The assignment of the present invention is the efficiency increase of the fluid medium power conversion, e.g. the water flow power or wind power, using the orthogonal turbines with the blades of hydrofoil profile and the imbalance elimination using the single-blade orthogonal turbines without using special masses at the side opposite to the blade, and keeping the material utilization low.

The technical result consists in the fact that there is an efficiency improving of the orthogonal turbines with blades of hydrofoil profile and the increase of the working reliability.

The mentioned task is solved and the technical result is achieved owing to the fact that the orthogonal power unit contains the orthogonal turbine with the shaft and blades of hydrofoil profile fixed around the shaft and along the last and has the power generator. At that the orthogonal turbine has six layers, and each layer of the turbine has one blade fixed at the shaft by the traverses. All the blades have the same mass calculated per unit of the blade length. The blades of turbine layers are located uniformly in the peripheral direction around the turbine shaft forming three pairs of the adjacent blades. In each pair the blades are located at the opposite sides relative to the shaft, the blades in the utmost pairs have the same length L. The blades in the middle pair have the bigger length $L_0 = L\, 2^{0.25}$ each if the relative shift of balanced pairs of blades are at 45° or same length $L_0 = L$ if the relative shift of balanced pairs of blades are at 60°. So this is the ratio of the traverse masses of the middle and utmost blade pairs.

Preferably the orthogonal power unit is provided with an extra orthogonal turbine located coaxially and symmetrical to the main orthogonal turbine and manufactured similar to the main orthogonal turbine. At this the blades profiles of the extra orthogonal turbine are oriented reverse relative to the blade profiles of the main orthogonal turbine, and the power generator is located between the turbines and is equipped with two counterrotating rotors.

It's known that the orthogonal turbines have the maximum power and technical efficiency in multilayer case and when each layer has a minimum quantity of blades. The highest power efficiency (above 60% in the free flow) is noticed when there is only one blade (for example see the magazine "Hydraulic engineering", Moscow, STC "Energoprocess" 1986, pages 33-37). However such a system requires the special mechanical balancing. For example if the loads are located at the side opposite to the blade this makes the turbine more complicated and expensive, so it led to the lack of single-blade orthogonal turbines in practice.

The optimum balancing of the orthogonal turbine is achieved by making the six-layer orthogonal turbine where each layer of the turbine has one blade fixed at the shaft by the traverses, as well as by making all the blades with the same mass calculated per unit of the blade length, uniform location of layers blades in the peripheral direction around the turbine shaft forming three pairs of the adjacent blades providing that in each pair the blades are located at the opposite sides relative to the shaft, the blades in the utmost pairs have the same length L and the blades in the middle pair have the bigger length $L_0 = L\, 2^{0.25}$ each if the relative shift of balanced pairs of blades are at 45° or same length $L_0 = L$ if the relative shift of balanced pairs of blades are at 60° and there is the same ratio of the traverse masses of the middle and utmost blade pairs.

This optimum balancing of the orthogonal turbine is connected with the fact that the utmost pairs of layers where the blades have the same length L, are located in the different radial planes coming through the shaft rotation axis of the orthogonal turbine and the middle pair of layers is located in the radial planes between the planes of the utmost layers. The pair of centrifugal forces has an effect on each pair of the blades in the near layers. To balance the force moments caused by these centrifugal forces the blades length in the middle pair of layers $L_0$ should have the above-mentioned ratio with the blades length L in the utmost pairs of layers, depending on the shift of pairs of blades.

Furthermore, the solution where the relative shift of blades pairs are at 60°, it will provide pulsation reduction of torque of hydrodynamic forces acting on the turbine.

Furthermore, the maximum power efficiency of the present technical solution is achieved thanks to the equal linear speed of the blades in all layers and the speed rate is selected according to the achievement of the above stated maximum efficiency of the kinetic energy conversion of the media flowing over the blades at the given speed. If we do not take the above mentioned condition into account the mechanical balancing of the described orthogonal turbine can be achieved by another method as well. For example, it can be done if we increase the radius of the turbine blade rotation around the shaft at keeping the length of the middle layer blades equal to the length of the outmost layers blades. In the general case the balancing condition can be written as follows $$R_0 L_0^2 \rho_0 + m_0 R_0 L_0/2 = (RL^2 \rho + mRL/2)\sqrt{2},$$

where index <<0>> indicated the parameters of the middle layer blades pair.

This shows that the most optimal way is to make the middle pair of the blades with the length bigger than the length of the blades in the outmost blade pairs according to the shown ratio, having the relative shift of blades pairs at 45°.

The same effect of balancing the torque of the centrifugal forces having the uniform length of all blades is achieved when the relative shift of balanced pairs of blades are not at 45°, but at 60°. Furthermore, in this case, it will provide pulsation reduction of torque of hydrodynamic forces acting on the turbine.

The proposal provides the conditions for maximum efficiency of each turbine blade usage and for simplification of the orthogonal turbine design due to the absence of any balancing weights, and in the long run it allows to increase the orthogonal turbine performance reliability.

BRIEF DESCRIPTION OF THE DRAWINGS

FIG. 1 has the shift of balanced pairs of blades at 45° while FIG. 3 has the shift of balanced pairs of blades at 60°.

Figure 1:
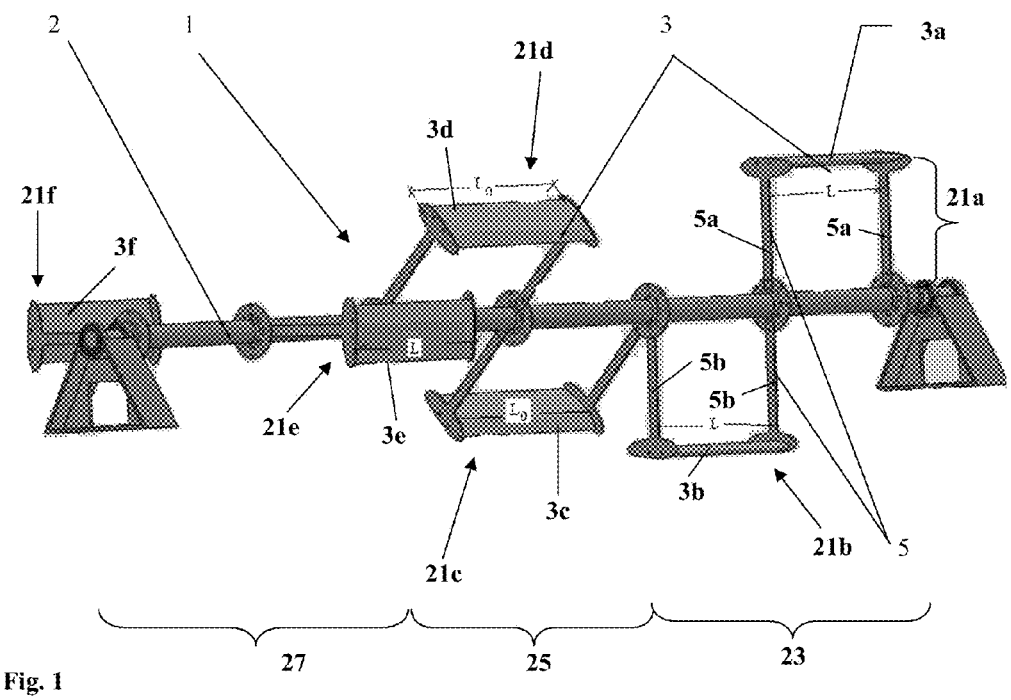
FIG. 1 and FIG. 3 are a general views of the orthogonal turbine of orthogonal power unit.
Figure 2:
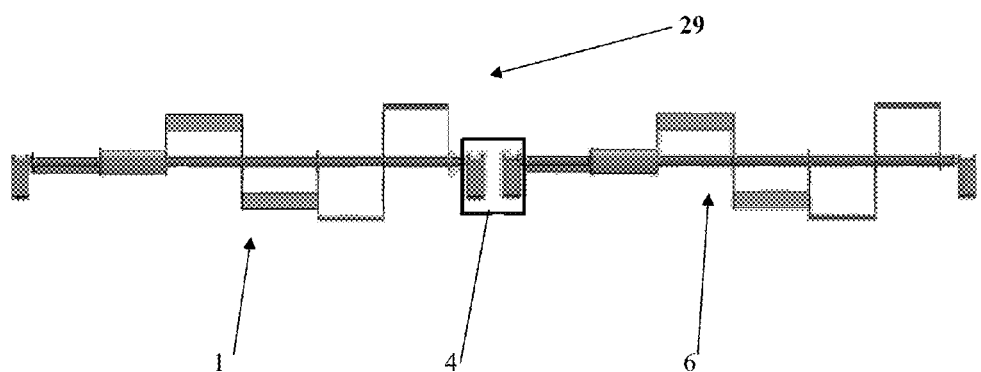
FIG. 2 is a schematic side view of the orthogonal power unit with two orthogonal turbines.

Each reference numeral indicated on FIGS. 1 and 2 is designated to an element of the inventive structure described herein below. A first time introduced reference numeral in the description is enclosed into parentheses.

DETAIL DESCRIPTION OF A PREFERRED EMBODIMENT OF THE INVENTION

As shown in FIG. 1, an orthogonal power unit contains an orthogonal turbine 1 (with a shaft 2 and hydrofoil profile blades 3, herein individually denoted as blades 3a-3f, fixed around the shaft 2 and along the last). The orthogonal turbine 1 is a six-layer turbine. Each layer 21 of the turbine 1 has one blade 3, fixed on the shaft 2 by means of two traverses 5. In the exemplary embodiment shown, a first layer 21a comprises two traverses 5a and the blade 3a, and a second layer 21b comprises the traverses 5b and the blade 3b. Each of the blades 3a-3f has the same mass calculated per unit of the blade 3 length. The blades 3 of turbine layers are located uniformly in the peripheral direction around the turbine shaft 2 of the turbine 1. In the exemplary embodiment shown, a third layer 21c comprises two traverses 5 and the blade 3c, a fourth layer 21d comprises two traverses 5 and the blade 3d, a fifth layer 21e comprises two traverses 5 and the blade 3e, and a fourth layer 21f comprises two traverses 5 and the blade 3f. In each layer the respective blades 3 are located at the opposite sides relative to the shaft 2.

The first layer 21a is thus located at the opposite side of the shaft 2 from the second layer 21b to form a first layer pair 23. In addition, only one traverse 5a in the first layer 21 is in line with only one traverse 5d in the second layer 23, as shown in the illustration. That is, the first layer 21a is offset from the second layer 21b by a distance of approximately "L" along the axis of the shaft 2. Similarly, the third layer 21c is located at the opposite side of the shaft 2 and offset from the fourth layer 21d by a distance of approximately "$L_0$" along the axis of the shaft 2 to form a second layer pair 25. The fifth layer 21e is located at the opposite side of the shaft 2 and offset from the sixth layer 21f by a distance of approximately "L" along the axis of the shaft 2 to form a third layer pair 27.

As further shown in the illustration, the second layer pair 25 is oriented at 45° relative to the first layer pair 23, and the third layer pair 27 is oriented at 45° relative to the second layer pair 25. The blades 3 in the first layer 21a, the second layer 21b, the fifth layer 21e, and the sixth layer 21f have the same length L and the blades 3 in the third layer 21c, and the fourth layer 21d have the bigger length $L_0 = L \cdot 2^{0.25}$ each. The traverse masses of the first layer pair 23 and the third layer pair 27 have the same ratio as the length L and the length $L_0$ ratio.

Figure 3:
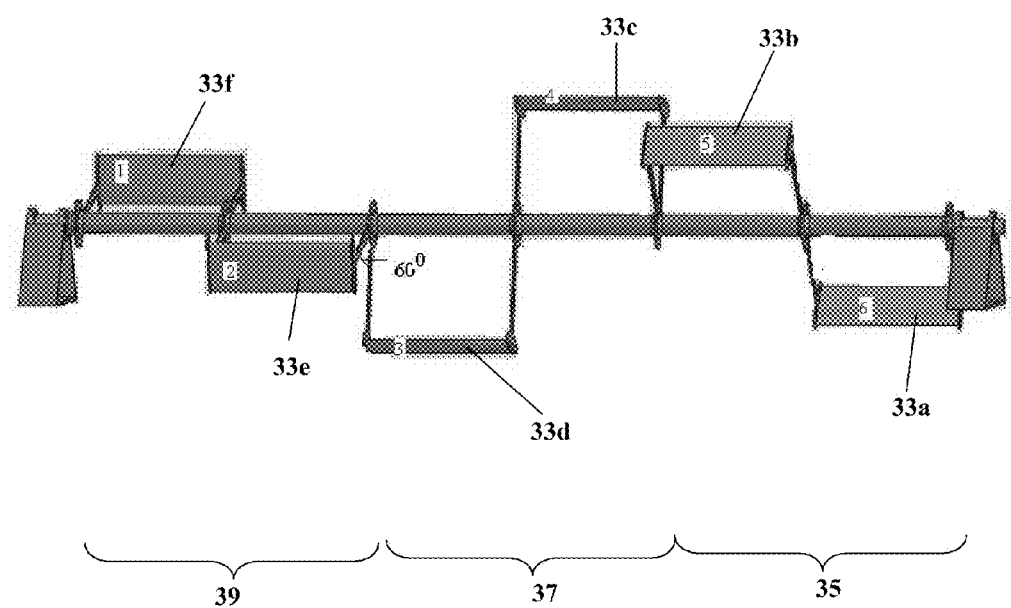

The same effect of balancing the torque of the centrifugal forces having the uniform length of all blades $L_0 = L$ is achieved with the relative shift of balanced pairs of blades not at 45° by at 60° and with the uniform traverses masses. Furthermore, in this case, it will provide pulsation reduction of torque of hydrodynamic forces acting on the turbine. FIG. 3 shows an orthogonal view of an orthogonal turbine 31 with the uniform blades 33a-33f. The blades 33a and 33b are part of a first layer pair 35, the blades 33c and 33d are part of a second layer pair 37, and the blades 33e and 33f are part of a third layer air 39. The second layer pair 37 is shifted with respect to the first layer pair 35 by 60°, and the third layer pair 39 is similarly shifted with respect to the second layer pair 37 by 60°.

An orthogonal power unit 29 is equipped with one extra orthogonal turbine 6 located coaxially and symmetrically to the main orthogonal turbine 1 and manufactured similar to the main orthogonal turbine 1, as shown in FIG. 2. In an alternative embodiment (not shown), the blades profiles 3 of the extra orthogonal turbine 6 may be oriented reverse relative to the blade profiles 3 of the main orthogonal turbine 1 so as to cause the extra orthogonal turbine 6 to counter rotate in a direction opposite to the rotation direction of the main orthogonal turbine 1. This configuration is advantageously used to provide a power unit comprising a power generator 4 located between the main orthogonal turbine 1 and the extra orthogonal turbine 6.

Orthogonal power unit operates as follows.

Under the effect of the media flow (wind or water if the power unit is located in a river or in intertidal flow) that collides with the orthogonal turbine 1 or with orthogonal turbines 1 and 6 in case of the power unit with two turbines 1 and 6 the orthogonal turbine 1 starts rotating and orthogonal turbines 1 and 6 start rotating in opposite directions. As the result of the orthogonal turbine 1 or the orthogonal turbines 1 and 6 rotation the rotor or the rotors of the power generator 4 rotate about the stator or the stators of the power generator 4 and the power generator starts producing electrical energy that is supplied to the consumer via a cable (not shown).

The present invention can be used for installation of environmental friendly power generating plants in the rivers and in the intertidal flows or for wind power generating units.

I claim:

1. An orthogonal turbine suitable for use in a media flow, said orthogonal turbine comprising:
   a shaft;
   a plurality of hydrofoil profile blades disposed about said shaft; and
   a plurality of traverses extending from said shaft, each of said hydrofoil profile blades fixed on said shaft by a respective two of said plurality of traverses, each said hydrofoil profile blade forming a layer with said two attached traverses, said plurality of traverses configured such that a first said layer is positioned at an opposite side of said shaft relative to a second layer to form a first layer pair, and said second layer is oriented at a predetermined angle with respect to a third layer, each said hydrofoil profile blade oriented with respect to the media flow so as to produce a rotation in said orthogonal turbine.

2. The orthogonal turbine of claim 1 wherein said predetermined angle comprises either forty five degrees or sixty degrees.

3. The orthogonal turbine of claim 1 wherein a blade length for said hydrofoil profile blades in said third layer comprises a longer blade length than a blade length for said hydrofoil profile blades in said first layer.

4. The orthogonal turbine of claim 3 wherein said blade length for said third layer comprises a length $2^{0.25}$ as long as said blade length for said first layer.

5. The orthogonal turbine of claim 1 further comprising a fourth layer positioned at an opposite side of said shaft relative to said third layer to form a second layer pair, wherein said blades in said first layer pair have the same mass calculated per unit of blade length as said blades in said second layer pair.

6. The orthogonal turbine of claim 1 wherein each of said hydrofoil profile blades is disposed at a uniform distance in a peripheral direction about said shaft.

7. The orthogonal turbine of claim 1 wherein said turbine comprises six hydrofoil profile blades, each said hydrofoil profile blade rotating about said shaft in a corresponding layer.

8. The orthogonal turbine of claim 7 wherein said hydrofoil profile blades form three pairs of adjacent blades disposed about said shaft.

9. An orthogonal power unit suitable for use in a media flow, said orthogonal power unit comprising:
   a first orthogonal turbine having;
   a first shaft;
   a plurality of first hydrofoil profile blades disposed about said first shaft; and
   a plurality of first traverses extending from said first shaft, each of said first hydrofoil profile blades fixed on said first shaft by a respective two of said plurality of first traverses, each said first hydrofoil blade forming a layer with said two attached first traverses, said plurality of first traverses configured such that a first layer is positioned at an opposite side of said first shaft relative to a second layer on said first shaft, and said second layer is oriented at a predetermined angle with respect to a third layer on said first shaft;
   a second orthogonal turbine having
   a second shaft;
   a plurality of second hydrofoil profile blades disposed about said second shaft;
   a plurality of second traverses extending from said second shaft, each of said second hydrofoil profile blades fixed on said second shaft by a respective two of said plurality of second traverses, each said second hydrofoil blade forming a layer with said two attached second traverses, said plurality of second traverses configured such that a fourth layer is positioned at an opposite side of said second shaft relative to a fifth layer on said second shaft, and said fifth layer is oriented at a predetermined angle with respect to a sixth layer on said second shaft, such that a blade profile orientation of a second hydrofoil profile blade is reverse to a blade profile orientation of a first hydrofoil profile blade; and
   a power generator with two counter-rotating rotors, a first said rotor mechanically attached to said first orthogonal turbine and a second said rotor mechanically attached to said first orthogonal turbine.

10. The orthogonal power unit of claim 9 wherein said second orthogonal turbine is located coaxially and symmetrically to said first orthogonal turbine.

11. A method for generating electrical energy comprising the steps of:
   providing a first orthogonal turbine having a plurality of first hydrofoil profile blades disposed about a first shaft, each said first hydrofoil profile blade affixed to said first shaft by two first traverses, each said first hydrofoil profile blade forming a layer with said two attached first traverses, said plurality of first traverses configured such that a first layer is positioned at an opposite side of said first shaft relative to a second layer, and said second layer is oriented at a predetermined angle with respect to a third layer on said first shaft;
   providing a second orthogonal turbine having a plurality of second hydrofoil profile blades disposed about a second shaft, each said second hydrofoil profile blade affixed to said second shaft by two second traverses, each said second hydrofoil profile blade forming a layer with said two attached second traverses, said plurality of second traverses configured such that a fourth layer is positioned at an opposite side of said second shaft relative to a fifth layer on said second shaft, and said fifth layer is oriented at a predetermined angle with respect to a sixth layer on said second shaft;
   connecting said first orthogonal turbine to a first rotor in a power generator;
   connecting said second orthogonal turbine to a second rotor in said power generator;
   applying a media flow to said first orthogonal turbine so as to turn said first orthogonal turbine in a first direction; and
   applying said media flow to said second orthogonal turbine so as to turn said second orthogonal turbine in one of said first direction or a second direction said second direction being opposite to said first direction.

12. The method of claim 11 wherein a blade profile orientation of said second hydrofoil profile blades is reverse to a blade profile orientation of said first hydrofoil profile blades.

* * * * *